United States Patent [19]

Rekers et al.

[11] Patent Number: 4,758,243

[45] Date of Patent: Jul. 19, 1988

[54] PROCESS FOR COLORING POLYESTER SHAPED ARTICLES

[75] Inventors: John W. Rekers, Spartanburg; William C. Kimbrell, Jr., Inman, both of S.C.

[73] Assignee: Milliken Research Corporation, Spartanburg, S.C.

[21] Appl. No.: 867,200

[22] Filed: May 27, 1986

[51] Int. Cl.$^4$ ............................................. C09B 69/10
[52] U.S. Cl. ........................................ 8/627; 525/437
[58] Field of Search ............ 8/115.54, 115.55, 115/56, 8/115.65, 647, 403, 527, DIG. 18, DIG. 4; 525/437

[56] References Cited

U.S. PATENT DOCUMENTS 4,284,729   8/1981   Cross et al. ...................... 521/158

Primary Examiner—Paul Lieberman
Assistant Examiner—John F. McNally
Attorney, Agent, or Firm—Terry T. Moyer; H. William Petry

[57] ABSTRACT

A process is provided for the coloration of a preformed polyester resin shaped article having improved dye migration properties, which comprises:

(a) coloring said article with a coloring agent in an amount sufficient to provide coloration to said shaped article; said coloring agent having the formula R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymer constituent has a molecular weight of from about 132 to about 5000; and $_n$ is an integer of from 1 to about 12; and X is selected from —OH, —NH$_2$, —SH, —O-COR$_1$, —CO$_2$H, —CO$_2$R$_1$, —SO$_3$H, —SO$_3$R$_1$ phosphate, phosphonite, urea, urethane, alkoxyl and alkoxide, wherein R$_1$ is a lower alkyl group containing from 1 to about 6 carbon atoms; and (b) grafting said coloring agent to said article by heating said article to a temperature below a temperature at which said article will melt, but to a high enough temperature and for a period of time sufficient to achieve grafting of said coloring agent to said article.

7 Claims, No Drawings

PROCESS FOR COLORING POLYESTER SHAPED ARTICLES

The present invention relates to a process for coloring polyester resin shaped articles having improved dye migration properties and to polyester resin shaped article products made thereby.

A variety of processes have been developed for the coloration of polyester resins and polyester articles with organic dyestuffs. These include coloration during melt processing, e. g., during fiber spinning or melt compounding; coloration by exhaustion from aqueous or organic solution or dispersions, e. g., jet dyeing; and thermofixation of dyestuffs at high temperature onto performed polyester articles, especially fibers and fabrics, e.g., the "thermosol" process.

The colored polyester resins and articles prepared by the above processes may suffer from certain deficiences because the colorants are generally only physical mixtures dissolved in the polyester resin. Therefore, during subsequent processing or during use of the polyester article, the colorants may tend to migrate and become extracted or leached. This is a particular problem with colored polyester fabrics in which dye migration problems are manifested by decreased colorfastness to laundering and dry cleaning, as well as color transfer by rubbing (crocking).

In addition, colored polyester fabrics in contact with organic polymer substrates(such as a polyvinylchloride laminate) tend to exhibit bleeding of the colorant to the substrate, particularly if the polymer substrate contains a plasticizer. Also, molded polyester articles (such as beverage containers) may show undesirable leaching of the colorant into the beverage product.

Attempts have been made to overcome these difficulties by the use of insoluble dyes or pigments which are incorporated into the polyester resin during melt compounding. Although improved migration properties are often obtained, the colored articles may be opaque and lack the brilliance of color afforded by soluble dyestuffs. Also, considerably more pigment may ordinarily be required to achieve the same depth of shade as that which may be obtained with a dye. Furthermore, use of pigments and insoluble dyes may give rise to problems with handling, storage, incorporation, and color blending.

More recently, yet another approach has been suggested for alleviating colorant migration problems. Thus, as disclosed in U.S. Pat. No. 4,284,729 to Cross, et al. (incorporated by reference), colorants have been provided which may, in principle, be covalently bound into certain thermosetting resins by copolymerization during the polyaddition reaction of a nucleophile with an electrophile, thereby minimizing colorant migration by making the color part of the polymer. Unfortunately, this coloration method presents practical problems in that the color and shade must be selected when the polyester resin is manufactured, thereby limiting its versatility Technical problems also arise because the colorants must withstand the high temperatures and catalysts used during manufacture of the polyester resin.

According to the present invention many of the problems associated with the coloration of polyester resins and many of the deficiencies associated with colored polyester resin products may be obviated or overcome. Thus, as compared to conventional colorants and coloration processes, the coloring agents employed in the process of the present invention are substantially bonded or grafted to a preformed polyester resin, and therefore are considerably less or even completely non-extractable, non-leachable, and non-migrating. Polyester resin shaped articles colored by this process show generally improved colorfastness as compared to conventionally colored articles, to laundering, dry cleaning, and rubbing and show less color bleeding into other polymer substrates than conventionally colored polyester articles. Molded polyester articles colored by the process of the present invention show similar useful improvements in color substantivity.

Thus, the present invention provides a process by which certain coloring agents can be partially or completely grafted to a preformed polyester resin so that the color is substantially or completely a part of the polymer product. As compared to conventional dyes, the coloring agents which are employed in the process of the present invention typically may exhibit a significantly and surprisingly diminished tendency toward dye migration, even when not grafted to the polyester resin. The process of the present invention provides methodology for a further significant improvement in dye migration properties when the coloring agents are partially reacted with the polyester resin, or, for complete non-migration properties, when the coloring agents are virtually completely reacted with the polyester resin.

A process is provided for the coloration of a preformed polyester resin shaped article having improved dye migration properties, which comprises: (a) coloring said article with a coloring agent in an amount sufficient to provide coloration to said shaped article; said coloring agent having the formula

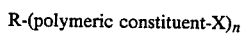

R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymer constituent has a molecular weight of from about 132 to about 5000; and $n$ is an integer of from 1 to about 12; and X is selected from —OH, —NH$_2$, —SH, —OCOR$_1$, —CO$_2$H, —CO$_2$R$_1$, —SO$_3$H, —SO$_3$R$_1$ phosphate, phosphonite, urea, urethane, alkoxyl and alkoxide,, wherein R$_1$ is a lower alkyl group containing from 1 to about 6 carbon atoms; and (b) grafting said coloring agent to said article by heating said article to a temperature below a temperature at which said article will melt, but to a high enough temperature and for a period of time sufficient to achieve grafting of said coloring agent to said article.

The polyester resins which may be used in the process of the present invention include a wide range of synthetic resins. The term "polyester" as used in this specification refers to synthetic polymers and copolymers which contains at least one ester or ester precursor functionality per monomer unit and in which said monomer unit is at least about 5% to about 100% of the total weight of the polymer, preferably about 25% to about 100% of the total weight. The general criterion is that there be a sufficient number of ester groups within the polymer so that grafting of the colorant may occur to obtain a useful depth of shade of the bound colorant. Preferred polyester resins include those which are produced by condensation of a difunctional acid or ester with a difunctional alcohol, such as polyethylene terephthalate, polybutylene terephthalate and glycol modified polyethylene terephthalate. Most preferred are fiber forming polyesters such as polyethylene terephthalate. It is also envisioned that blends of a polyester resin with another resin may be colored by the process of the present invention.

As mentioned above, the polyester resins are provided with partially or essentially completely non-extractable coloration. The colorants useful in the process of the present invention may be most broadly described as alkyleneoxy substituted chromophore groups. The chromophore groups of the colorant may vary widely, and may include compounds characterized in the art as dyestuffs or as pigments. The actual group used will depend to a large extent upon, for instance, the color and colorfastness characteristics derived in the colored polyester resin or article. Examples of suitable chromophore radicals include nitroso, nitro, azo, including monoazo, diazo, and trisazo, diarylmethanes, triarylmethanes, xanthone, acridine, methine, triazole, indamine, azine, oxazine, and anthraquinone radicals. The above mentioned chromophore radicals are well known and understood by those skilled in the art. Particularly useful chromophores for the colorants employed in the process of the present invention may be the azo, anthraquinone, and methine radicals. Azo chromophore radicals may be most preferred.

The chromophore group of the colorants employed in the process of the present invention is substituted with one or more polyalkyleneoxy groups. It is believed that these groups provide the point of attachment of the colorant to the polyester, possibly by a condensation reaction between the polymer and colorant during the process. This mechanism is suggested only as a plausible explanation for the observed result of non-extractable color, and should not be construed as a limitation on the process. Other possible mechanisms include reaction of the colorant and polymer through peroxides formed on the polyalkyleneoxy group or on the polyester, or through activated end groups formed by depolymerization of the polyalkyleneoxy group. Typical polyalkyleneoxy groups which may be attached to the chromophore radical are the polymeric epoxides, such as the polyalkylene oxides and copolymers thereof. Typical polyalkylene oxides and copolymers of same which may be employed to provide colorants useful in the process of the present invention include those made from alkylene oxide monomers containing from one to about four carbon atoms. Examples include polyethylene oxides, polypropylene oxides and polybutylene oxides, and other copolymers including block copolymers, in which a majority of the polymeric substituent is polyethylene oxide, polypropylene oxides and/or polybutylene oxide.

The average molecular weight of the polyalkyleneoxy, substituent on the chromophore radical may be important in the process of the present invention. Generally, higher molecular weight substituents may be less compatible with the polyester resin. This may be of importance in non-melt coloration dyeing methods (e. g., dyeing from an aqueous bath). On the other hand, greater reactivity in the grafting process may occur with higher molecular weight polyalkyleneoxy substituents. In addition, advantageous physical properties of the colorant, such as fluidity, water solubility or decreased volatility may be obtained with higher molecular weight substituents. Generally, the polyalkyleneoxy substituents may have an average molecular weight of from about 132 to about 5000, preferably from about 176 to about 2000, most preferably from about 220 to about 1000.

The number of polyalkyleneoxy groups substituted on the chromophore radical may have an effect on the reactivity of the colorant to grafting using the process of the present invention. Usually from 1 to about 12 polyalkyleneoxy substituent groups are preferred, from about 2 to about 6 are more preferred, and from 2 to about 4 are most preferred.

The polyalkylenoxy groups substituted on the chromophore radical are terminated with groups which do not significantly interfere with and may enchance the grafting of the colorant to the polyester resin. Preferable end groups include hydroxyl, amine, amino, mercaptan, ester, carboxylic, acid, carboxylate, carbonate, sulfate, sulfonate phosphate, phosphonite, urea, urethane, alkoxyl and alkoxide. More preferable end groups include hydroxyl, amine, and urethane; hydroxyl is most preferred. It may be advantageous to maximize grafting of the colorant without undesirable side effects by employing more than one of the preferred end groups in the colorant, such as hydroxyl and sulfonic acid.

According to a preferred embodiment the colorants may be characterized as follows:

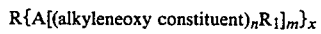

wherein R-A is an organic chromophore group, A is a linking moiety in said organic chromophore group selected from the group consisting of N, O, S or $CO_2$, the alkylene moiety of the alkyleneoxy constituent contains from 2 to about 4 carbon atoms, n is an integer of from 2 to about 120, m is 1 when A is O, S, $CO_2$ and 1 or 2 when A is N, x is an integer of from 1 to 5, and the product of n times x times m (n·m·x) is from 2 to about 120, and $R_1$ is a member of the group consisting of

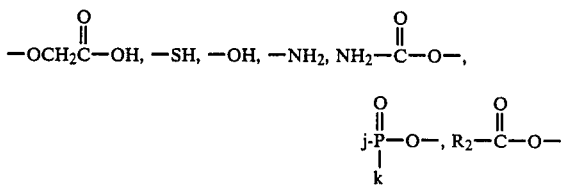

and sulfonates and sulfates of each of the members of said group, wherein $R_2$ is H, OH, an alkyl radical containing up to about 20 carbon atoms or alkyl substituted carbonyl radical containing up to about 20 carbon atoms, j and k are OH OM or $OR_3$ wherein M is a cation moiety of an alkali metal, an alkaline earth metal of ammonium, and $R_3$ is an alkyl radical containing up to about 20 carbon atoms.

As mentioned above, the colorants may be employed in the polyester resins in a minor amount sufficient to provide the desired degree of coloration in the resin. The actual amount used will, in addition to the desired depth of shade, depend upon the tinctorial strength of the chromophore used and the overall molecular weight of the colorant, e. g., chromophore plus polyalkyleneoxy chain length. Typically the amount of colorant employed may be from about 0.001 percent to about 5 percent, preferably from about 0.01 percent to about 3 percent, by weight based upon the overall weight of the resin composition.

Other conventional additives may also be present in the polyester resins colored by the process of the present invention. For instance, such additives may include plasticizers, antioxidants, stabilizers, lubricants, nucleating agents and other additives which will be readily identified by those skilled in the art. In general, the colorants have been observed to have little or no adverse interactions with these conventional additives.

Any suitable procedure may be employed to produce the colorants of the invention whereby the polymeric constituent, or constituents, are coupled to an organic dyestuff radical. For example, the procedure set forth in U.S. Pat. No. 3,157,663, hereby incorporated by reference, may be employed. The particular shade of the colorant will depend primarily upon the particular chromophore group selected. A large variety of colors and shades may be obtained by blending two or more colorants. Blending of the colorants of the present invention can be readily accomplished as the colorants are polymeric materials which may have substantialy identical solubility characteristics, which are dictated by the nature of the polymeric chain. Therefore, the colorants are in general soluble in one another, and are also in general completely compatible with each other.

For example, the colorants of the invention may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides, such as ethylene oxide, propylene oxide, or even butylene oxide, according to procedures well known in the art, and then coupling the resulting compound with a diazonium salt of an aromatic amine. In order to prepare colorants of the triarylmethane class, aromatic amines that have been reacted as stated above with an alkylene oxide are condensed with aromatic aldehydes and the resulting condensation products are oxidized to form the triarylmethane colorants. While azo, methine and anthraquinone colorants are preferred because of their ease of preparation and brilliance of color as well as the multitude of shades available, many other colorants may be prepared by known procedures.

According to the process of the present invention, the colorants are incorporated into the polyester resin or article using essentially conventional coloration dyeing techniques. These would include incorporation during melt compounding by mixing the colorant with the polyester resin by extrusion, calendaring, molding, or the like. It is particularly convenient to incorporate the colorants into formed polyester articles, such as fiber or fabric, by exhaustion from a dye bath. Suitable temperatures for exhaustion depend on the colorant structure and the composition of the dye liquor. From aqueous dye liquors, exhaustion may be effected at temperature from about 50° C. to 150° C. Lower temperatures may be suitable for liquor containing carriers or organic solvents.

It has been found that it is especially convenient to incorporate the colorant into polyester textile articles using a so-called thermosol, or themofixation process. In this variation, the colorant is applied primarily to the surface of the polyester from a solution or dispersion. Aqueous solutions are especially convenient. The polyester article is subsequently dried and heated to cause penetration of the colorant into the resin. Suitable temperatures to effect colorant penetration depend on the structure and amount of colorant, as well as the type of polyester article. Typically, temperatures of about 125° C. to about 250° C. are appropriate, preferably about 175° C. to about 235° C., most preferably about 190° C. to about 225° C. Treatment times may generally be in the range of about 15 seconds to about 15 minutes, preferably about 1 to 5 minutes.

It may be advantageous to incorporate other ingredients into the colorant or dye liquor to improve the coloration process or colorfastness characteristics. These may include stabilizers, UV absorbers, antioxidants, peroxide decomposers, nucleating agents, thixotropes, wetting agents, antimigratory agents, carriers, levelers, organic or inorganic salts, and the like. Such ingredients are well known to those skiled in the art.

According to the process of the present invention, grafting of the colorants (that is,the process by which the colorants become non-extractable) is effected either concurrent or subsequent to the dye incorporation process. Generally, conventional coloration processes are not sufficient to cause substantial or complete grafting of the colorant, although modifications of conventional processes employing the methodology disclosed herein may be used to effect substantial or complete grafting.

By substantial grafting it is meant that the level of non-extractable colorant as a percent of the total colorant is sufficient to impart beneficial migration properties to the polyester article beyond that which would be obtained from the ungrafted colorants. Generally, a minimum of at least 25% to about 75% of the incorporated colorant should be grafted to obtain such an improvement. By complete grafting it is meant that the colorant has become essentially completely non-migrating and non-extractable from the polyester article. Generally, at least 75% to about 100% of the incorporated colorant should be grafted to obtain these properties.

According to the process of the invention, substantial or complete grafting of the colorants is effected by subjecting the polyester article or resin containing the colorants to thermal energy or actinic radiation. The extent of grafting in the process is essentially and time and energy input related phenomenon. For example, substantial or complete grafting of the colorants to a polyester fiber or fabric can be effected at temperatures as low as aobut 120° C. to about 150° C. in a period of about 4 to 48 hours. Substantial or complete grafting may be obtained much more quickly at higher temperatures, for example, at about 175° C. to about 200° C. in about 30 minutes to 14 hours, or at about 200° C. to about 250° C. in less than 30 seconds to about 3 hours. The thermal conditions selected to effect grafting will depend on the concentration and structure of the colorant, the desired level of non-migration characteristics, and the thermal stability constraints dictated by the type of polyester resin or article being treated by the process.

It has been found to be particularly convenient in the case of polyester textiles and fibers to effect the grafting process concurrent to the colorant incorporation process. Thus, for example, the colorant may be incorporated into the polyester article by a thermal process using temperatures and processing times moderately greater than those conventionally used (under the constraints described above) and thereby obtain substantial or complete grafting of the colorant. Such a process may be continuous, batch, or a combination of the two.

It may also be convenient in the case of polyester textile and fiber to incorporate the colorants by a conventional bath dyeing procedure (e.g., jet dyeing) and subsequently graft the colorants using the procedures described above.

Methods of energy input other than thermal processing may also be used to effect grafting. Actinic radiation, especially microwave or infrared radiation, has been found to be useful in this regard.

The following examples illustrate the invention, but are not to be construed as limiting the invention which is defined in the claims.

EXAMPLE 1

One hundred and sixty-five and four tenths part of 2-chloro-4-(methylsulfone)aniline were added to a cold (less than 40° C.) mixture of 205.5 parts of 70% sulfuric acid and 535 parts water. One and six tenths parts of 2-ethylhexanol were added followed by the slow addition of 370.5 parts of 40% nitrosyl sulfuric acid. The temperature was maintained at less than 0° C. during the addition by use of a dry ice/isopropanol bath. The solution was stirred about 1.5 hours. Excess nitrite was then destroyed by slow additions of a total of 10 parts of sulfamic acid. The absence of nitrite was determined by the use of starch-iodide indicator paper. The resulting yellow solution contains 0.627 millimoles per gram of active diazonium salt and was maintained at a temperature less than 0° C. until used.

Thirty-one and five tenths millimoles of the ten mole ethoxylate of aniline were mixed with 50 parts of water. Thirty millimoles (47.8 parts) of the above-described diazo solution were then slowly added with stirring. The temperature was maintained at 20°-30° C. by the addition of crushed ice. The solution was allowed to stand for at least one hour and then neutralized by the addition of 50% aqueous sodium hydroxide. The mixture thus obtained was extracted with 50 milliliters of methylene chloride. The methylene chloride extract was washed twice with equal portions of water and the methylene chloride then removed under reduced pressure to afford the product.

Using the general procedure described above, a series of related colorants were prepared. A general structure for the colorants is set forth in Table 1 below where $R_1$ through $R_8$ are as set forth in Table 1.

EXAMPLES 2-18

These examples illustrate the incorporation and grafting into a polyester fabric of various azo colorants containing a variety of polyalkyleneoxy substituent groups.

Solutions (0.5% concentration) of the colorants were prepared in water, methanol, or acetone, and padded onto a 100% polyester woven fabric. Excess dye liquor was removed by squeezing to give about 80% wet pick up. The fabrics were heated in a forced air oven at 190°-210° C. for 15 minutes. A small swatch of each of the dyed fabrics was rinsed with methanol to remove surface dye, and the level of colorant penetration was rated visually on a scale of 1.0 to 5.0 by comparing the rinsed and unrinsed samples (1.0=slight dye penetration, 5.0=nearly quantitative dye penetration). The results are shown in Table 1.

The following abbreviations are utilized in the following Table: EO=ethyleneoxide; PO=propyleneoxide; Et=ethyl. Unless otherwise indicate, the polyalkyleneoxy groups are hydroxyl terminated.

TABLE 1

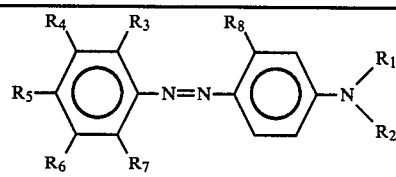

| EXAMPLE NUMBER | $R_1 + R_2$ | $R_3$ | $R_4$ | $R_5$ | $R_6$ | $R_7$ | $R_8$ | Color | Level of Colorant Penetration |
|---|---|---|---|---|---|---|---|---|---|
| 2 | 20EO | CN | H | NO$_2$ | H | H | H | Red-violet | 3.5 |
| 3 | 10EO | CN | H | NO$_2$ | H | H | H | Red-violet | 4.5 |
| 4 | 2EO/10PO/8EO | Cl | H | (CH$_3$)$_2$NSO$_2$ | H | Br | H | Orange | 2.5 |
| 5 | 20EO | H | H | H | H | CO$_2$CH$_3$ | H | Yellow | 3.0 |
| 6 | 2EO/15PO/5EO | H | H | (CH$_3$)$_2$NSO$_2$ | H | H | OCH$_3$ | Pinkish-Orange | 1.5 |
| 7 | 10EO | CF$_3$ | H | H | H | H | H | Yellow | 4.5 |
| 8 | 2EO/15PO/5EO | OH | H | H | CH$_3$ | H | H | Yellow | 1.5 |
| 9 | 20EO | H | H | CH$_3$SO$_2$ | H | H | CH$_3$ | Orange | 3.0 |
| 10 | 2EO/15PO/5EO | CN | CH$_3$ | CO$_2$C$_2$H$_5$ | H | CN | H | Red-violet | 1.5 |
| 11 | 10EO | Cl | H | CH$_3$SO$_2$ | H | H | H | Orange | 4.0 |
| 12 | 10EO | Cl | H | NO$_2$ | H | Cl | H | Brown-Orange | 5.0 |
| 13 | 10EO | Cl | H | NO$_2$ | H | H | H | Red | 5.0 |
| 14 | 10EO | Cl | H | CH$_3$SO$_2$ | H | H | Cl | Orange | 4.5 |
| 15 | 10EO | Cl | H | NO$_2$ | H | Cl | Cl | Brown-orange | 5.0 |
| 16 | 10EO | CN | H | NO$_2$ | H | H | CF$_3$ | Red | 5.0 |
| 17 | 10EO | Cl | H | Cl | H | H | Cl | Yellow | 5.0 |
| 18 | 10EO | CN | H | NO$_2$ | H | B | CH$_3$ | Blue | 5.0 |

As used in the above Table 1 and the other Tables hereinafter, EO refers to —O—C$_2$H$_4$— and CO refers to —O—C$_3$H$_6$—

EXAMPLES 19-23

These examples illustrate the incorporation and grafting of several methine colorants into polyester fabric.

A mixture of 55.95 grams of 4-formylaniline 20 mole ethoxylate, 5.95 grams of ethyl cyanoacetate, and 2.8 grams of ammonium carbonate were stirred and heated to 95°-100° C. for 2 hours. The reaction was stripped under vacuum to give the bright yellow methine colorant of Example 19 (E=39.1@423 nm). The colorants used in Examples 20–23 were prepared in a similar manner.

The fabrics were treated with the above colorants as in Examples 2–18. The results are shown in Table 2.

TABLE 2

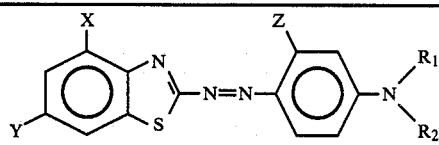

| EXAMPLE NUMBER | $R_1 + R_2$ | X | Y | C | LEVEL OF COLORANT PENETRATION |
|---|---|---|---|---|---|
| 19 | 20EO | $CO_2Et$ | H | Yellow | 4.0 |
| 20 | 20EO, diacetate | $CO_2Et$ | H | Yellow | 4.0 |
| 21 | 20EO | CN | $CH_3$ | Yellow | 3.5 |
| 22 | 10EO | CN | $CH_3$ | Yellow | 4.0 |
| 23 | 10EO | CN | Cl | Yellow | 4.5 |

EXAMPLES 24–31

These examples illustrate the incorporation and grafting of several benzothiazole azo colorants prepared according to the procedures set forth in U.S. Pat. No. 4,400,320 to Keller, et al., at column 5, lines 10 through 59, with various polyalkyleneoxy substituent chains into polyester fabric. The fabrics were treated as in Examples 2–23. The results are shown in Table 3.

TABLE 3

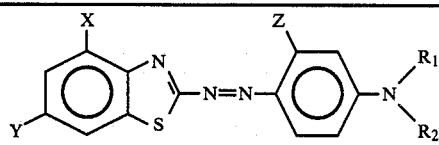

| EXAMPLE NUMBER | $R_1 + R_2$ | X | Y | Z | Color | LEVEL OF COLORANT PENETRATION |
|---|---|---|---|---|---|---|
| 24 | 2EO/15PO/5EO | Cl | H | H | Red | 1.5 |
| 25 | 2EO/15PO/5EO | Cl | Cl | H | Pinkish Red | 1.5 |
| 26 | 20EO | H | H | H | Red | 3.0 |
| 27 | 2EO/15PO/5EO | H | Cl | H | Pinkish Red | 1.5 |
| 28 | 2EO/15PO/5EO | $OCH_3$ | H | H | Pinkish Red | 1.5 |
| 29 | 12EO | $CH_3$ | H | Cl | Red | 4.5 |
| 30 | 10EO | H | $OCH_3$ | Cl | Red | 5.0 |
| 31 | 2EO/15PO/5EO | Cl | H | $CH_3$ | Pinkish Red | 1.5 |

EXAMPLE 32

A small swatch of the polyester fabric obtained from example 29 was rinsed with methanol and was then dissolved in m-cresol. After precipitation with methanol, a substantial amount of the red color remained in the polymer. This process was repeated with virtually no loss in color.

EXAMPLE 33

This example illustrates the relative rates of colorant penetration and grafting during an extended thermosol dyeing process. One hundred percent polyester woven fabrics were padded with aqueous solutions containing 0.75% colorant, squeezed between nip rolls, and dried. The fabrics were then heated at 218° C. for 1, 3, 5, and 10 minute intervals. Surface colorant was determined by colorimetric analysis of the dye removed by a methanol rinse from a small swatch. Ungrafted colorant which had penetrated into the polyester fiber was determined by colorimetric analysis of a hot dimethyl formamide extract. Grafted colorant was calculated by the difference. The results obtained for two of the colorants are shown in Table 4.

TABLE 4

| | APPLIED % OF TOTAL COLORANT | | |
|---|---|---|---|
| | On Surface OF FIBER | Inside Fiber NOT GRAFTED | GRAFTED |
| A. COLORANT OF EXAMPLE 21: | | | |
| 0 Min. @ 218° C. | 100 | 0 | 0 |
| 1 Min. @ 218° C. | 47 | 38 | 5 |
| 3 Min. @ 218° C. | 34 | 35 | 31 |
| 5 Min. @ 218° C. | 29 | 31 | 40 |
| 10 Min. @ 218° C. | 20 | 26 | 54 |
| B. COLORANT OF EXAMPLE 12: | | | |
| 0 Min. @ 218° C. | 100 | 0 | 0 |
| 1 Min. @ 218° C. | 15 | 73 | 12 |
| 3 Min. @ 218° C. | 9 | 73 | 18 |
| 5 Min. @ 218° C. | 6 | 56 | 38 |
| 10 Min. @ 218° C. | 2 | 31 | 67 |

The results indicate that after conventional thermosol conditions (30–90 sec. at 204° C.) much less than 20% of the applied colorant would be grafted to the polyester.

EXAMPLE 34

This example demonstrates the grafting rate enhancement obtained with colorants containing multiple polyalkyleneoxy substituent groups.

A colorant was prepared having the same chromophore radical as the colorant used in Examples 12 and 33 B except the coupling component was the 10 mole ethoxylate of N,N-bis(2,3-dihydroxypropyl)aniline, thus providing four polyalkyleneoxy substituent groups on the chromophore radical. The grafting of this colorant was examined using the procedure of example 33 and the results are shown in Table 5.

TABLE 5

| | % OF TOTAL APPLIED COLORANT | | |
|---|---|---|---|
| MIN. @ 218° C. | On Surface OF FIBER | Inside Fiber NOT GRAFTED | GRAFTED |
| 0 (Control) | 100 | 0 | 0 |
| 1 | 25 | 45 | 30 |
| 3 | 12 | 37 | 51 |
| 5 | 9 | 29 | 62 |
| 10 | 5 | 19 | 76 |

By comparison to Example 33 B, the results indicate a slightly slower rate of dye penetration but more rapid grafting of the multisubstituent colorant.

EXAMPLES 35–40

These examples are further demonstration of colorant penetration and grafting to a polyester fabric in an extended thermosol process. The colorants were evaluated as in Example 33, except the dye liquor in this case contained one percent colorant, one percent caprolactam (a carrier and intensifier), a wetting agent, and an antimigratory agent. The results are shown in Table 6.

TABLE 6

Structure: benzene ring with substituents X, Y, Z, A, connected via $-N=N-$ to another benzene ring with $-NR_1R_2$

| | | | | % OF TOTAL APPLIED COLORANT INSIDE FIBER | | | |
|---|---|---|---|---|---|---|---|
| | | | | NOT GRAFTED Min. @ 218° C. | | GRAFTED Min. @ 218° C. | |
| Example # | X | Y | Z | A | 5 | 10 | 5 | 10 |
| 35 | CN | $NO_2$ | H | H | 51 | 32 | 42 | 65 |
| 36 | CN | $NO_2$ | H | Cl | 50 | 25 | 47 | 74 |
| 37 | Cl | $NO_2$ | H | H | 59 | 36 | 36 | 62 |
| 38 | Cl | $NO_2$ | H | Cl | 62 | 36 | 35 | 62 |
| 39 | Cl | $NO_2$ | Cl | H | 61 | 31 | 35 | 67 |
| 40 | Cl | $NO_2$ | Cl | Cl | 57 | 29 | 40 | 70 |

EXAMPLE 41

This example demonstrates the effect on grafting of the molecular weight of the polyalkyleneoxy substituent group. A series of colorants were prepared having the same chromophore radical but different substituent groups, as shown in Table 7. The colorants were padded onto a 100% polyester fabric from ca 0.7 mm solutions and heat treated for 20 minutes at 200° C. Swatches from each of the dyed fabrics were rinsed with methanol to remove surface dye, and a second swatch from each dyeing was extracted exhaustively with methylene chloride to remove all colorant not grafted to the polyester. Shade differences ( E*) between the rinsed and extracted samples relative to the dyed only fabrics were recorded on a color differences meter (CIELAB coordinates). A higher propensity toward grafting is thus indicated by a smaller color difference between the rinsed and extracted fabric. The results are showonn in Table 7.

TABLE 7

Structure: $CH_3O_2S$—(benzene with Cl)—$N=N$—(benzene)—$NR_1R_2$

| Number | $R_1 + R_2$ | Substituent Molecular Weight | MeOH Rinsed | $CH_2Cl_2$ Extracted | E* |
|---|---|---|---|---|---|
| 1 | $CH_3, CH_3$ | 30 | 3.95 | 60.09 | 56.14 |
| 2 | 2EO | 40 | 5.18 | 17.55 | 12.37 |
| 3 | 4EO | 178 | 5.31 | 4.48 | .83 |
| 4 | 2EO/8PO | 442 | 7.81 | 10.43 | 2.62 |
| 5 | 2EO/15PO/5EO | 1180 | 7.89 | 9.72 | 1.83 |
| 6 | 10PO | 582 | 14.10 | 22.33 | 8.23 |
| 7 | 20EO | 882 | 7.57 | 9.11 | 1.54 |

The data shows that the colorant not having a polyalkylene oxide substituent (#1) is completely extracted by methylene chloride, while that containing only two ethylene oxide groups (#2) is largely not grafted. The colorants containing higher molecular weight substituent chains (numbers three through seven) are grafted to a significantly greater extent.

EXAMPLE 42

A series of benzothiazole colorants were prepared and tested as in Example 41. The results are shown in Table 8.

TABLE 8

Structure: $CH_3O$—(benzothiazole)—$N=N$—(benzene)—$NR_1R_2$

| Number | $R_1 + R_2$ | Substituent Molecular Weight | MeOH Rinsed | $CH_2Cl_2$ Extracted | E* |
|---|---|---|---|---|---|
| 1 | 2EO | 88 | 2.59 | 13.90 | 11.31 |
| 2 | 4EO | 176 | .51 | 5.13 | 4.62 |
| 3 | 10EO | 440 | 5.50 | 6.00 | .50 |
| 4 | 2EO/8PO | 552 | 4.36 | 5.36 | 1.00 |

The results again indicate the higher level of grafting obtained with the higher molecular weight colorants.

EXAMPLE 43

This example shows the practical utility of grafted colorants in a polyester fabric laminated to polyvinylchloride (PVC), and the effect on grafting of heat treatment subsequent to the dyeing process.

Fabrics were dyed according to the procedures of examples 35–40 for 5 minutes at 425° F. and surface dye was removed by a standard scouring procedure (hydrosulfite/caustic). Samples of each fabric were then heated at 350° F. for 2, 4, and 6 hours to further graft the colorants. The fabrics were then laminated for 1 minute to a white PVC sheet (20 mils thick) using a press which provided a series of increasing lamination temperatures from about 280° F. to about 350° F. The laminates were then aged for 3 days at 50° C. and inspected for colorant migration through the PVC sheet. The approximate lamination temperature at which obvious colorant migration was observed and the level of grafted colorant (determined by DMF extraction) are shown in Table 9. A commercial polyester laminating fabric (dyed conventionally with disperse dyes) showed obvious migration at a laminating temperature of 290° F.

TABLE 9

| HEAT TREATMENT | COLORANT OF EXAMPLE 37 | | COLORANT OF EXAMPLE 39 | |
| --- | --- | --- | --- | --- |
| | % GRAFTED[2] | MIGRATION TEMP.(°F.) | % GRAFTED[2] | MIGRATION TEMP.(°F.) |
| 5 min. @ 425° F.[1] | 49 | 280 | 59 | 280 |
| +2 hrs. @ 350° F. | 74 | 300 | 83 | 310 |
| +4 hrs. @ 350° F. | 92 | 320 | 96 | 340 |
| +6 hrs. @ 350° F. | 97 | 340 | 98 | >350 (No Migration) |

[1] dyed only
[2] % of Colorant in Fiber (dimethylformamide extraction)

We claim:

1. A process for the coloration of a preformed polyester resin shaped article having improved dye migration properties, which comprises:
   (a) coloring said article with a coloring agent in an amount sufficient to provide coloration to said shaped article; said coloring agent having the formula R-(polymeric constituent-X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymer constituent has a molecular weight of from about 132 to about 5000; and $n$ is an integer of from 1 to about 12; and X is selected from —OH, —NH$_2$, —SH, —OCOR$_1$, —CO$_2$H, —CO$_2$R$_1$, —SO$_3$H, —SO$_3$R$_1$ phosphate, phosphonite, urea, urethane, alkoxyl and alkoxide, wherein R$_1$ is a lower alkyl group containing from 1 to about 6 carbon atoms; and
   (b) grafting said coloring agent to said article by heating said article to a temperature below a temperature at which said article will melt, but to a high enough temperature and for a period of time sufficient to achieve grafting of said coloring agent to said article.

2. The process of claim 1 wherein R is selected from nitroso nitro, azo, including monoazo, diazo, and trisazo, diarylmethanes, triarylmethanes, xanthene, acridene, methine, trialzole, indamine, azine, oxazine, and anthraquinone radicals.

3. The process of claim 1 wherein said coloring agent is of the formula

R{A[(alkyleneoxy constituent)$_n$R$_1$]$_m$}$_x$ wherein R A is an organic chromophore group, A is a linking moiety in said organic chromophore group selected from the group consisting of N, O, S or CO$_2$, the alkylene moiety of the alkyleneoxy constituent contains from about 2 to about 4 carbon atoms, as is an integer of from 2 to about 120, m is 1 when A is O, S, CO$_2$ and 1 or 2 when A is n, x is an integer of from 1 to about 5 and the product of n times x times m (n·x·x) is from 2 to about 120, and R$_1$ is selected from the group consisting of

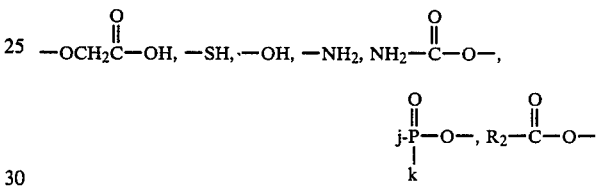

and sulfonates and sulfates of each of the members of said group, wherein R$_2$ is H, OH, an alkyl radical containing up to about 20 carbon atoms or alkyl substituted carbonyl radical containing up to about 20 carbon atoms, j and k are OH OM or OR$_3$ wherein M is a cation moeity of an alkali metal, an alkaline earth metal or ammonium, and R$_3$ is an alkyl radical containing up to about 20 carbon atoms.

4. The process of claim 1 wherein said preformed polyester resin-shaped article is a textile material.

5. The process of claim 1 wherein said colorant is applied to said polyester resin-shaped article in an amount of from about 0.001% to about 10% by weight based upon the overall weight of the resin composition.

6. The process of claim 1 wherein said colorant is applied to said polyester resin-shaped article form an aqueous solution, said article is subsequently dried and heated to cause penetration of said colorant into said resin.

7. The process of claim 1 wherein said coloring agent is grafted to said article by heating said article to a temperature of from about 175° C. to about 250° C.

* * * * *

UNITED STATES PATENT AND TRADEMARK OFFICE
CERTIFICATE OF CORRECTION

PATENT NO. : 4,758,243
DATED : July 19, 1988
INVENTOR(S) : John W. Rekers, et al.

It is certified that error appears in the above-identified patent and that said Letters Patent is hereby corrected as shown below:

In Claim 3, line 8, delete "as" and substitute --n--.

In Claim 3, line 10, delete "n" and substitute --N--.

In Claim 3, line 11, delete "(n•x•x)" and substitute --(n•x•m)--.

In Claim 3, line 20, between "OH" and "OM", insert --,--.

Signed and Sealed this

Eleventh Day of June, 1991

Attest:

HARRY F. MANBECK, JR.

Attesting Officer

Commissioner of Patents and Trademarks